Patented Jan. 5, 1926.

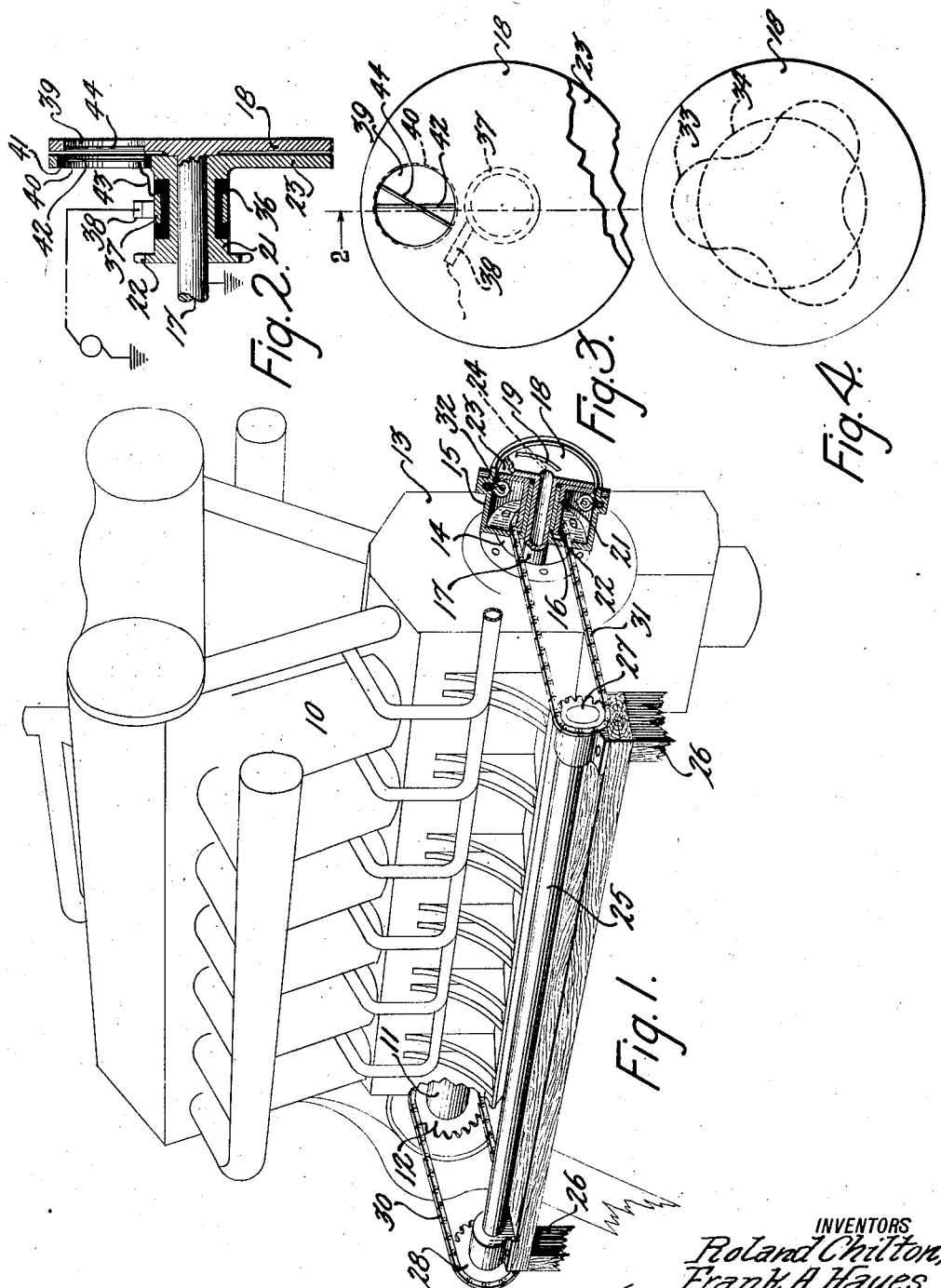

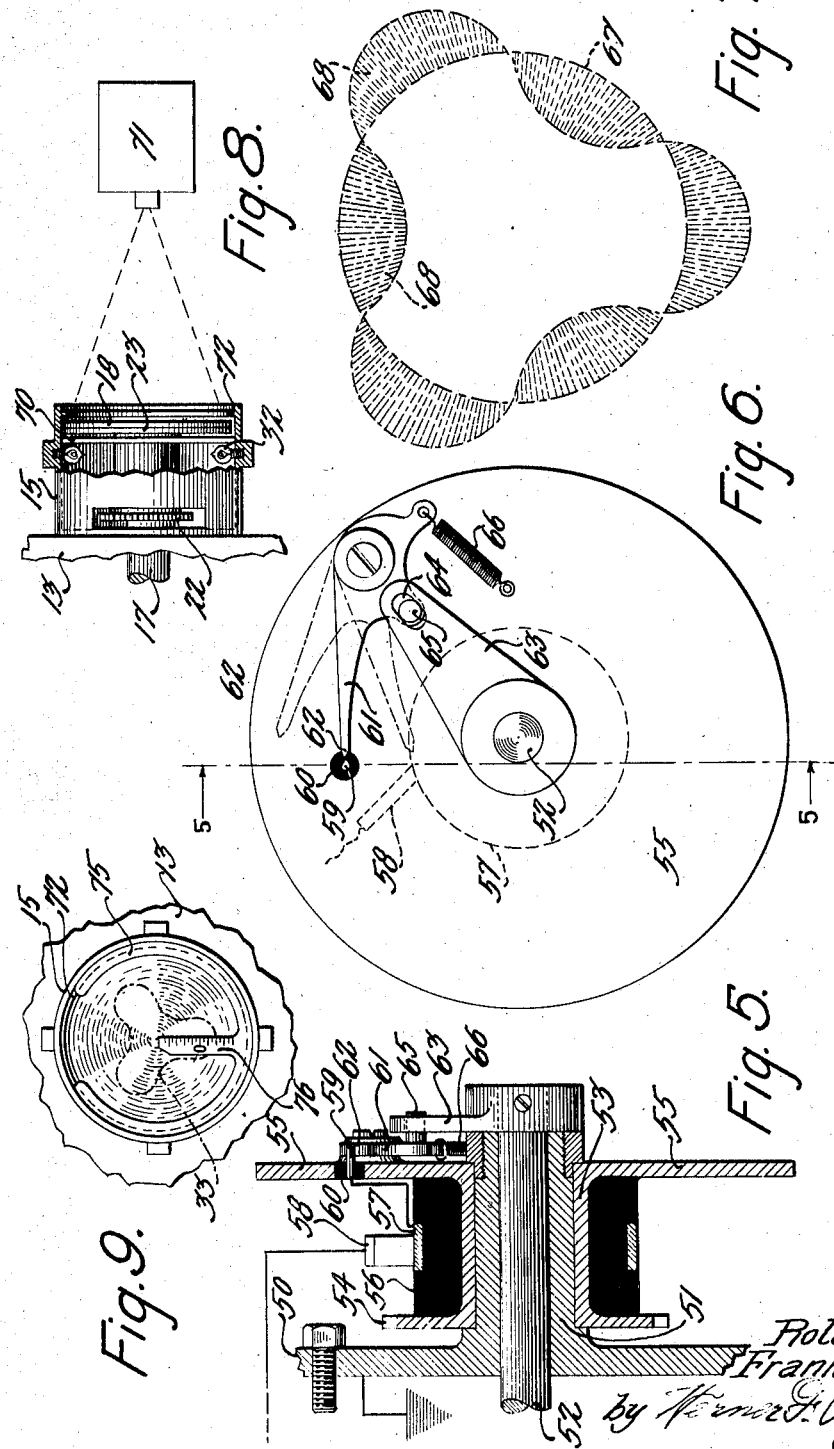

1,568,544

UNITED STATES PATENT OFFICE.

ROLAND CHILTON AND FRANK A. HAYES, OF KEYPORT, NEW JERSEY, ASSIGNORS TO AEROMARINE PLANE & MOTOR COMPANY, A CORPORATION OF NEW YORK.

TORSION METER.

Application filed September 5, 1923. Serial No. 661,085.

*To all whom it may concern:*

Be it known that we, ROLAND CHILTON, a subject of the King of England, and FRANK A. HAYES, a citizen of the United States, and both residents of Keyport, in the county of Monmouth and State of New Jersey, have invented certain new and useful Improvements in Torsion Meters, of which the following is a specification, reference being had to the accompanying drawings, forming part of this specification.

This invention relates to improved means for obtaining visual and graphic records of the relative angular motion between two parts of a rotating system. More specifically, the invention contemplates an improved means for obtaining visual indication or graphically recorded diagrams representing to accurate scale the torque deflections in a shaft system.

As with torsion meters in the prior art, the apparatus of this disclosure can be used either to indicate the relative motion between the two points of a system to which the two elements of the device are connected, or between one point of a rotating system and a member rotated at uniform speed, such as a yieldingly driven fly-wheel.

The method of connecting the rotational elements of the torsional meter to the points of the shaft system whose relative behavior is to be studied is not in itself a part of this invention, the principal object of which is to afford simple and accurate means for obtaining a polar diagram representing accurately to scale small relative oscillations between two members which are rotating at the same average speed. The present invention aims at being especially useful in the case where a shaft is subject to high frequency torque variations which result in cyclic torsional deflections during each revolution. Multiple cylinder engine crankshafts are a case in point, and in the drawings the application of this invention to such an engine is illustrated.

Many of the torsion meters of the prior art are adapted to measure the average torsional deflection on a shaft, and while the present invention can be used for this purpose, it is intended to be primarily adapted to show in addition, the actual frequency and amplitude of torsional vibrations occurring in each revolution. In the case where an indication of average deflection or torque is required, mechanical or electrical connection means for obtaining a stationary diagram from the relative behavior of the rotating parts can be used since the damping effects of such apparatus are in that case advantageous. On the other hand, when it is desired to accurately measure the torsional vibrations no damping or inertia effects or lost motion can be permitted in the parts used to translate the relative motion between the torsion meter elements so that the same can be recorded on a stationary scale.

The essential feature of this invention consists in a means for moving a light aperture or a source of light radially inwardly and outwardly in sympathy with the relative rotation between two adjacent members when they are rotating at relatively high speed. Owing to the "persistence of vision" this rotating point of light will appear to plot a continuous path which will be of constant radius, i. e., circular, when the deflection is constant, and will vary inwardly and outwardly from this reference circle in sympathy with the variations in torque.

To these and other ends, the invention consists in certain improvements and the combination and arrangements of parts, all as will be more fully hereinafter described, the features of novelty being pointed out particularly in the claims at the end of the specifications.

In the drawings:—

Figure 1 is a perspective view of an internal combustion engine showing the present invention as applied thereto.

Figure 2 is a vertical section taken on the line 2 of Fig. 3 and illustrates a modification of the form shown in Fig. 1.

Figure 3 is a fragmentary end view of the form shown in Fig. 2.

Figure 4 graphically illustrates a visualization of cyclic torsional deflections in a drive shaft as would be seen by using either one of the forms shown in Figs. 1 and 2.

Figure 5 is a vertical section taken on the line 5—5 of Fig. 6 showing a further modification of the form shown in Fig. 1.

Figure 6 is an end view of Fig. 5.

Figure 7 graphically illustrates a visualization of torsional deflections of a driven shaft as observed by the use of the forms shown in Figs. 5 and 6.

Figure 8 is a side elevation on an enlarged scale of the form shown in Fig. 1 illustrating the manner in which a permanent graphic record can be obtained by photography of torsional deflections in a shaft.

Figure 9 is an end view of the device showing a scale attached thereto for the purpose of measuring the polar coordinates of the path of travel of a point of light.

In the present instance with reference to Fig. 1, 10 designates a multiple cylinder engine, 11 the crankshaft thereof to one end of which there is a sprocket wheel 12.

Secured to the crankcase 13 in any suitable manner and adjacent an opening 14 therein, is a preferably cylindrical open ended casing 15 which is provided with an integral sleeve portion 16.

An extension shaft 17 is attached to the crankshaft 11 and projects through the opening 14, said shaft 17 is rotatable within the sleeve 16 and is provided with a circular disk 18 at its extreme outer end. In this disk 18 there is formed a curved slot 19.

A hub 21 having a sprocket portion 22 is rotatably mounted on the sleeve 16 and is provided with a circular disk 23 disposed adjacent to the disk 18. In this disk 23 there is formed a radial slot 24 which is disposed in its assembled relation so as to intersect the curved slot 19 approximately intermediate the two ends thereof.

A lay shaft 25 is mounted on the standards 26 in a position parallel to the crankshaft 11 and is provided on either end with sprocket wheels 27 and 28, the sprocket 28 being driveably connected by a chain 30 to the sprocket 12 of the shaft 11, the sprocket 27 on the other end of the shaft 25 being connected by a chain 31 to the sprocket portion 22 of the hub 21.

It will be readily understood from the foregoing description and with reference to Fig. 1 that the disk 18 will be rotated directly by the extension shaft 17, whereas the disk 23 will be rotated from the other end of the crankshaft 11 by means of the lay shaft 25, consequently, if torsional deflections occur in the crankshaft 11 there will be relative movement between the two ends of the shaft, which will result in relative movement between the disks 18 and 23, causing the point of intersection of the slots to move radially inward or outward.

If the disk 23 is provided with a radial slot as before stated, and the curved slot in disk 18 has the form of an Archimedean spiral, then the radial movement of the point of intersection will be proportionate to the relative angular deflection of disk 18 with respect to disk 23. Hence although the slots in disks 18 and 23 may be given any desired form provided only that they intersect each other within the range of the instrument it is advantageous to make these slots respectively radial and of the spiral form described.

It will be further understood that when the interior of the case is illuminated as by the lamps 32 the point of intersection of the slots will be brightly illuminated while the general surfaces of the disks are preferably of dark color. The resulting point of light will move radially inwardly and outwardly in sympathy with the relative motion between the two adjacently disposed disks 18 and 23. In normal use the disks will be rotating at relatively high speed and as hereinbefore mentioned, owing to the persistence of vision, the point of light will appear to the eye of the observer as plotting a continuous path such as is indicated by the broken line 33 in Figure 4, wherein the line 34 indicates the base circle. In this manner a visual polar diagram of cyclic torque deflections in a shaft system is obtained. The diagrams illustrated are those which will be obtained from a shaft exhibiting three cyclic torsional vibrations per revolution.

With reference to Figs. 2 and 3 there is shown a modification of the form shown in Fig. 1 and in which the two disks 18 and 23 are individually driven as described in the foregoing from either end of the crankshaft. In this particular showing the hub 21 is provided with an annular insulated portion 36 in which is embedded a conductive slip ring or contact member 37 and on which bears a brush or conductor 38. The disks are provided each with an opening 39 and 40 respectively, said openings being in axial alignment with each other in assembled relation. In the opening 40 there is secured in suitable insulated portions 41 an electrically conductive rod or wire 42 which is connected to ring 37 by any suitable means conductive of electricity as 43, said wire 42 being disposed radial of the axis of rotation.

In the opening 39 of the disk 18 there is secured a rod or wire 44 disposed adjacent to the wire 42 and at an angle thereto as shown in Fig. 3 so that the two wires will intersect with a slight gap or clearance therebetween. It will be readily understood by those skilled in the art that when a high tension current used in connection with a suitable interrupter passes through a conductor 45 to the brush 38 and thence to the wire 43, a spark will jump from the wire 42 to the wire 44 at the intersection of the two wires, it being assumed that the wire 44 is properly grounded.

This spark will travel radially inwardly or outwardly when relative motion takes place between the two discs, forming a path of light similar to that shown in Fig. 4, and substantially the same as produced by the device in Fig. 1.

Referring to Figures 5 and 6 there is shown a further modification, in which 50 designates a fixed member, 51 a sleeve portion thereon, 52 the extension shaft rotatable in the sleeve 51, a hub 53 having a sprocket 54 is driven from the lay shaft 25 and a disk 55 is rotatably mounted on the sleeve 51. An annular member 56 composed of insulating material has a conducting ring 57 imbedded therein on which bears a brush 58. A spark point 59 is secured in an insulated portion 60 of disk 55 and is suitably connected to the ring 57. A member 61 having a spark point 62 is pivotally mounted on the disk 55 in a manner so that under normal conditions a small gap will exist between the points 59 and 62. The member 61 is so positioned on the disk that the point 62 will swing as nearly radial as possible to the axis of rotation of the disk 55.

To the shaft 52 there is secured an arm 63 having a slot 64 connecting with a pin 65 in the member 61. A spring 66 is provided to counteract any back lash effect on the pivoted member 61.

It is apparent that when there is a deflection in the crankshaft to which this particular device is applied there will be a relative motion between the disk 55 and the arm 63 which will result in the spark point 62 being moved inwardly and outwardly past the point 59 to positions such as shown in broken lines, thus increasing or decreasing the gap in proportion to the deflection of the shaft. With this last mentioned construction, and assuming that the device is connected to a suitable source of current, a varying short or long spark will result on either side of a base circle 67, Fig. 7 forming a relatively broad path of light 68 as distinguished from that of Fig. 4.

The particular formation or contour of the path of light as diagrammatically shown in both Figs. 4 and 7 would result only from deflections having three cycles per revolution, and is given merely as an example of a reading with one form of crankshaft.

In Fig. 8 we have shown a means by which a permanent record may be obtained for future reference by photography and in which a piece of ground glass 70 can be interposed between the lamps 32 and the disks 18, or between the disks and the camera 71. A piece of sensitized paper may be used in lieu of the camera, said paper being clamped against the flange 72 of the casing 15 in any convenient manner.

With reference to Fig. 9 there is shown a means for measuring the path of travel of a point of light, or for ascertaining the extent of deviation of said light from a given point or base circle. The annular member 75 composed of relatively light sheet material and having a scale portion 76 can be secured in the casing 15 and against the flange 72 in any convenient manner as by frictional engagement.

A suitable reflector may be provided within the casing 15 to project the light from the aperture in the disks.

Variations may be resorted to within the scope of the invention, and portions of the improvements may be used without the others.

Having thus described our invention, we claim,

1. In apparatus of the class described, a casing, a pair of members mounted for rotation within the casing and for relative movement to each other, an illuminant within the casing, and means on said members for producing a spot of light for rotation with said members and for moving said spot radially in sympathy with relative motion between the members.

2. A torsion meter for a rotating shaft including means for producing a beam of light rotating parallel to an axis, means for moving the beam radially of the axis in sympathy with the deflection of the shaft, in combination with means for recording the path plotted by said beam.

3. In a device for obtaining visual indication of torsional deflections in a shaft system, a pair of members rotated each from different points of the shaft system, a means operative by relative motion of said members induced by torsional deflections in the shaft to move a point of light rotating with the members radially in and out of a base circle.

4. In a device for obtaining graphic records of torsional deflections in a shaft system, a pair of members rotated from separate points on the shaft system, means operative by relative motion of said members induced by torsional deflections in the shaft to project a rotating beam of light parallel to axis of rotation and to move the same radially in and out of a base circle, in combination with means for recording the path of the light so projected.

5. The combination with a power means having a drive shaft, of a casing fixed adjacent one end thereof, a first disk mounted in the casing and drivably connected to the end of the shaft, a second disk mounted adjacent the first disk and drivably connected to a remote part of the shaft, elongated apertures in both of said disks so disposed relatively as to cause an intersection thereof, and means within the casing adapted to illuminate the intersection of said apertures continuously throughout their revolution.

6. In the art of visualizing torsional deflections in a shaft system, a fixed casing, a pair of adjacent disks rotatably mounted in said casing and respectively driven from divers points of the shaft in a manner so that a deflection in the shaft will cause relative angular motion between said disks, elongated means associated with each of said disks so disposed relatively to one another as to cause an intersection thereof, means adapted to create a luminous spot at the intersection of the elongated means, said luminous spot rotating about the axis of the shaft and moving radially thereof in harmony with torsional deflections therein.

7. In a device of the class described, the combination with an internal combustion engine having a drive shaft, of a casing secured to said engine and disposed adjacent one end of the shaft, a pair of disks rotatably mounted within the casing and driven from either end of the shaft respectively, illuminating means within the casing, elongated apertures in said disks so disposed relatively to one another as to cause an intersection thereof, means for illuminating said point of intersection throughout a complete revolution.

8. In a device for producing a visible indication of deflections in a drive shaft, a drive shaft, a pair of adjacent members individually driven from divers portions of the shaft and adapted for relative angular movement, an illuminant, a means associated with both of said members and coacting with said illuminant to produce a closed polar diagram radially varying in accordance to deflections in the shaft.

9. In a device for producing a visible indication of deflections in a drive shaft, a drive shaft, a pair of adjacent members individually driven from divers portions of the shaft and adapted for relative angular movement, an illuminant, a means associated with both of said members and coacting with said illuminant to plot a luminous annulus diagrammatic of deflections in the shaft upon rapid rotation of the members.

10. In the art of measuring the torque load of a drive shaft, the combination with a drive shaft, of a casing fixed adjacent the shaft, a pair of members in said casing rotated individually therein through driving means associated with different portions of the shaft, said members so mounted as to permit of relative movement, a slot in each of the members, said slots being so disposed as to intersect one another to form an aperture, a means for illuminating the interior of said casing so as to constantly cause a light to issue from said aperture.

11. In apparatus of the class described, in combination, a shaft to be tested, a casing fixed adjacent one end thereof, a portion of the shaft extending into said casing a first disk secured to the shaft, a slot in the disk, a second disk rotatably mounted on a portion of the casing and adjacent to the first disk, a substantially radial slot in the disk, the slot of the first disk disposed so as to intersect the radial slot to form an aperture, a means for rotating the second said disk from a remote portion of the shaft, and means for constantly illuminating the intersection of said slots from the interior of said casing.

12. In apparatus of the class described, the combination with a drive shaft to be tested, of a casing fixed adjacent one end thereof, a first disk member rotatably mounted in the casing and operated directly from said shaft, a second disk mounted in said casing in a manner as to permit of it being rotated relatively to the first said disk, a lay shaft driven from a remote portion of the shaft and adapted to drive the second said disk, one or more elongated apertures in each of said disks so disposed relatively that the apertures of one disk intersect those of the other, illuminating means within the casing adapted to constantly illuminate the intersection of said apertures during their travel.

13. In apparatus of the class described, the combination with a drive shaft to be tested for cyclic torsional deflections, of a casing fixed adjacent one end thereof, a first disk member rotatably mounted in the casing and operated directly from said shaft, a second disk member rotatably mounted in said casing and adjacent to the first disk, a power transmitting means driven from a remote portion of the shaft and adapted to drive the second said disk, elongated apertures in each of said disks so disposed relatively that the apertures of one disk intersect those of the other, means within the casing adapted to constantly illuminate the intersection of said apertures, the whole so organized that the rapid rotation of the disks from remote portions of the drive shaft will cause a visible manifestation in the form of a closed polar diagram of cyclic torsional deflections in the drive shaft.

Signed at Keyport in the county of Monmouth and State of New Jersey this 31st day of August A. D. 1923.

ROLAND CHILTON.
FRANK A. HAYES.